US011880324B2

(12) United States Patent
Hasler (10) Patent No.: US 11,880,324 B2
(45) Date of Patent: Jan. 23, 2024

(54) BATTERY DATA TRANSLATOR (71) Applicant: Caterpillar Inc., Peoria, IL (US)

(72) Inventor: Gregory S Hasler, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 291 days.

(21) Appl. No.: 17/353,240

(22) Filed: Jun. 21, 2021

(65) Prior Publication Data
US 2022/0405222 A1    Dec. 22, 2022

(51) Int. Cl.
G06F 13/38    (2006.01)
G06N 20/00    (2019.01)

(52) U.S. Cl.
CPC .......... G06F 13/382 (2013.01); G06N 20/00 (2019.01)

(58) Field of Classification Search
CPC .............................. G06F 13/382; G06N 20/00
See application file for complete search history.

(56) References Cited

U.S. PATENT DOCUMENTS

| | | | |
|---|---|---|---|
| 9,559,528 B2 | 1/2017 | Kim et al. | |
| 10,230,245 B2 | 3/2019 | Adest et al. | |
| 10,826,304 B1* | 11/2020 | Thomas | H01M 10/482 |
| 2012/0153729 A1 | 6/2012 | Song et al. | |
| 2015/0370753 A1* | 12/2015 | Wagh | H04L 47/76 710/105 |
| 2017/0289317 A1* | 10/2017 | Seemann | H04L 12/12 |
| 2020/0231023 A1* | 7/2020 | Sathasivam | H01M 10/633 |
| 2022/0269284 A1* | 8/2022 | Chen | B60W 60/001 |
| 2022/0340048 A1* | 10/2022 | Yokoo | B60L 58/40 |

FOREIGN PATENT DOCUMENTS

| | | | |
|---|---|---|---|
| CN | 106787031 A | 5/2017 | |
| CN | 109088461 A | 12/2018 | |
| EP | 1262863 B1 * | 11/2006 | G06F 1/1616 |
| JP | 3772034 B2 | 5/2006 | |
| WO | WO2016194537 A1 | 12/2016 | |

OTHER PUBLICATIONS

European Search Report for Int'l. Patent Appln. No. 22175684.4-1202, dated Nov. 10, 2022 (7 pgs).

* cited by examiner

Primary Examiner — Henry Tsai
Assistant Examiner — John B Roche
(74) Attorney, Agent, or Firm — Lee & Hayes, PLLC (57) ABSTRACT A machine power system of a machine may use energy provided by one or more batteries. The machine power system may also use battery data associated with the batteries to monitor the batteries, configure electrical components to operate in association with the batteries, to provide battery information via a user interface, and/or for other operations. The machine power system may be configured to use a particular battery data format. A battery data translator receives native battery data provided by a battery, uses a translation map associated with the battery to convert the native battery data into translated battery data formatted based on the particular battery data format used by the machine power system, and provides the translated battery data to the machine power system.

20 Claims, 4 Drawing Sheets

BATTERY DATA TRANSLATOR

TECHNICAL FIELD

The present disclosure relates to batteries for machines and, more particularly, to a battery data translation system that is configured to translate battery data that is output by a battery into a different format used by a power system of a machine.

BACKGROUND

Vehicles and other machines include power systems, such as inverters and other systems, that receive and use energy from one or more batteries. Many of these machine power systems are configured to receive battery data from the batteries, such as diagnostic data, battery health data, and/or other types of data. The machine power systems may use the battery data to configure operations of one or more elements of the machine power systems, monitor the batteries, use the battery data to display battery information in user interfaces, and/or use the battery data in other ways.

However, a machine power system may be configured to use battery data that is provided in a particular format. For instance, software and/or firmware of the machine power system may be coded to interpret battery data in a particular format. Accordingly, the machine may be limited to accepting batteries that are also configured to provide battery data in the particular format that the power system of the machine is configured to interpret and use.

Some systems have been developed that allow a machine to accept different types of batteries. For example, U.S. Pat. No. 10,230,245 to Adest, et al. (hereinafter "Adest") describes a power management and conversion module that can allow a battery to emulate another type of battery, regardless of the types of power cells in the battery. However, although Adest can make a battery appear to be a different type of battery to a host machine, Adest achieves this emulation by changing the output voltage of the battery, and/or other attributes of the energy output by the battery, to cause the battery to emulate power attributes of another type of battery. Adest does not convert battery diagnostic data or other battery data from a native data format used by the battery into another data format that a power system of the host machine is configured to accept and use. As a result, Adest does not allow a machine power system, that is configured to use a particular battery data format, to receive and use battery data from any type of battery.

The example systems and methods described herein are directed toward overcoming one or more of the deficiencies described above.

SUMMARY OF THE INVENTION

According to a first aspect, a battery data translator includes one or more processors, a first data transmission interface, a second data transmission interface, and memory. The first data transmission interface is configured to communicate with a battery, and the second data transmission interface is configured to communicate with a machine power system. The memory stores computer-executable instructions that, when executed by the one or more processors, cause the battery data translator to perform operations. The operations include receiving native battery data from the battery via the first data transmission interface, the native battery data being associated with a first battery data format. The operations also include determining a translation map associated with the battery, the translation map indicating a plurality of mappings between first data elements of the first battery data format and second data elements of a second battery data format associated with the machine power system. The operations also include converting, based on the translation map, the native battery data into translated battery data, and transmitting the translated battery data to the machine power system via the second data transmission interface.

According to a further aspect, a computer-implemented method includes receiving, by one or more processors of a battery data translator associated with a machine, native battery data associated with a battery installed in the machine. The computer-implemented method also includes determining, by the one or more processors, a translation map associated with the battery. The translation map indicates a plurality of mappings between first data elements of a first battery data format associated with the native battery data, and second data elements of a second battery data format associated with a machine power system of the machine. The computer-implemented method further includes converting, by the one or more processors and based on the translation map, the native battery data into translated battery data, and causing, by the one or more processors, transmission of the translated battery data to the machine power system.

According to another aspect, a machine includes a battery, a machine power system, and a battery data translator. The battery is configured to output energy and native battery data associated with a first battery data format. The machine power system is configured to receive the energy from the battery, and to receive battery data associated with a second battery data format. The battery data translator is positioned in a data communication path between the battery and the machine power system. The battery data translator is configured to receive the native battery data from the battery, and to determine a translation map associated with the battery. The translation map indicates a plurality of mappings between first data elements of the first battery data format and second data elements of the second battery data format. The battery data translator is also configured to convert, based on the translation map, the native battery data into translated battery data, and to transmit the translated battery data to the machine power system.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
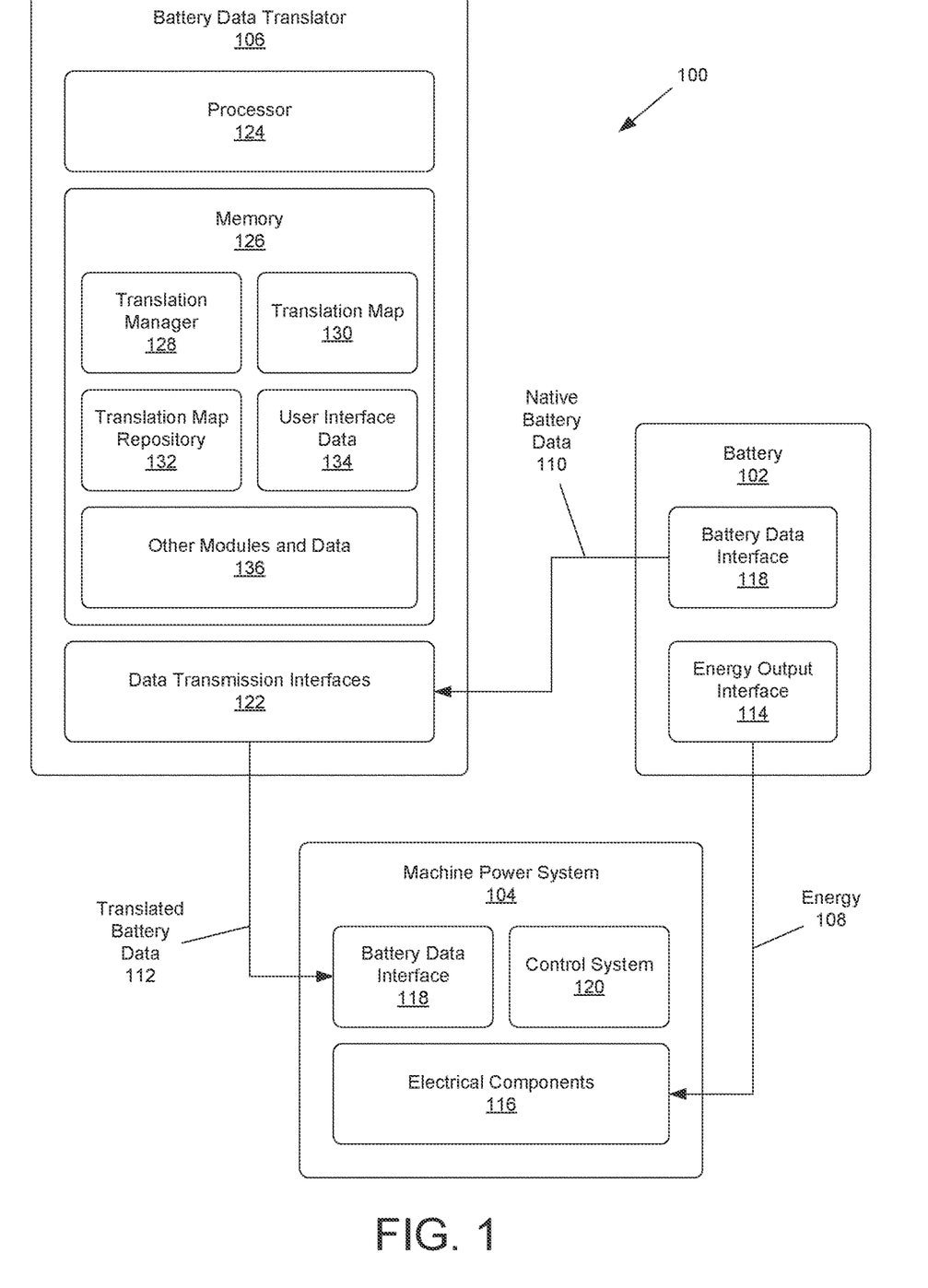
FIG. 1 shows a first example schematic view of a machine system that includes a battery, a machine power system, and a battery data translator.

FIG. 1 shows a first example schematic view of a machine system 100 that includes a battery 102, a machine power system 104, and a battery data translator 106. The machine power system 104 receives energy 108 from the battery 102. The machine power system 104 also receives battery data, such as diagnostic data and other information, associated with the battery 102. The machine power system 104 may be configured to use battery data that is formatted according to a particular format. However, the battery 102 may be configured to output native battery data 110 in a format that is different than the format used by the machine power system 104. The battery data translator 106 accordingly receives the native battery data 110 output by the battery 102, converts the native battery data 110 into translated battery data 112 that is formatted based on the particular format used by the machine power system 104, and provides the translated battery data 112 to the machine power system 104.

The machine system 100 shown in FIG. 1 is part of a machine, such as a vehicle, industrial equipment, or any other type of machine that is at least partially powered by the battery 102. In some examples, the machine can be a work vehicle, such as a wheel loader, a backhoe, a bulldozer, a tanker, a paver, a compactor, an excavator, a crusher, a tractor, a farm vehicle, a dump truck, another type of truck, or any other type of vehicle. In other examples, the machine can be a vehicle used for personal or commercial transportation, such as an electric automobile or other electric vehicle, a hybrid vehicle, or a fuel-based vehicle that is at least partially powered by the battery 102. In still other examples, the machine can be a stationary or portable piece of work machinery or other equipment that is at least partially powered by the battery 102. In some examples, multiple batteries may provide power to the machine, as discussed below with respect to FIG. 2.

The battery 102 can be a lithium-ion (Li-ion) battery, a lithium-ion polymer battery, a nickel-metal hydride (NiMH) battery, a lead-acid battery, a nickel cadmium (Ni—Cd) battery, a zinc-air battery, a sodium-nickel chloride battery, or any other type of battery. The battery 102 includes at least one energy output interface 114 that can output energy 108. For example, the energy output interface 114 can include electrical terminals that can be connected to electrical cables, or other hardware, to transfer energy 108 from the battery 102 to the machine power system 104.

The battery 102, and/or other batteries, can be removable from the machine. For example, a previous battery can be removed from the machine, and the battery 102 can be installed in the machine in place of the previous battery by connecting the energy output interface 114 of the battery 102 to the machine power system 104. The battery 102 can also be connected to the battery data translator 106 during installation, as discussed further below.

The machine power system 104 includes electrical components 116, such as circuits, that can receive and use the energy 108 from the battery 102. For example, the electrical components 116 can include electrical terminals that can be connected to electrical cables, or other hardware, to receive the energy 108 output by the battery 102. The electrical components 116 of the machine power system 104 can also convert the energy 108 received from the battery 102, and/or use the energy 108 to power one or more elements of the machine. For example, the machine power system 104 can use energy 108 from the battery 102 to power one or more electric motors of the machine, electronic control units or other computing systems that at least partially control operations of the machine or individual components of the machine, user interface displays of the machine, lights of the machine, and/or any other electronic or electrical elements of the machine.

In some examples, the electrical components 116 of the machine power system 104 can include one or more power conversion systems, bi-directional power systems, and/or other power systems. For instance, the machine power system 104 may include a DC-to-DC converter and a DC-to-AC inverter. The DC-to-DC converter can be configured to convert direct current (DC) received from the battery 102 from one voltage level to another voltage level. The DC-to-AC inverter may configure DC to alternating current (AC) that can power other electrical components of the machine. Accordingly, the DC-to-DC converter may convert DC received from the battery to a voltage level that is compatible with the DC-to-AC inverter.

The battery 102 and the machine power system 104 each have at least one battery data interface 118 that can send and/or receive battery data and other communications. Such battery data or other communications may be transmitted, via the battery data interfaces, using a Modbus communication protocol or another communication protocol. In some examples, a battery data interface can be an Ethernet port, or other Ethernet-based interface. For instance, the battery 102 can transmit native battery data 110 via an Ethernet cable attached to a battery data interface of the battery 102. In other examples, a battery data interface can be a serial port, a controller area network (CAN) bus interface, a Universal Serial Bus (USB) port, a serial to Transmission Control Protocol (TCP)/Internet Protocol (IP) interface, or other type of data interface.

The battery 102 can transmit battery data, such as the native battery data 110 shown in FIG. 1, that indicates diagnostic information about the battery 102, status information about the battery 102, alerts indicating faults associated with the battery 102, and/or any other information about the battery. For example, the native battery data 110 may indicate a current charge state of the battery 102, a maximum charge level of the battery 102, a discharge rate of the battery 102, a voltage level associated with the battery 102, a temperature of the battery 102, one or more battery health parameters associated with the battery 102, and/or any other metrics or types of information associated with the battery 102. In some examples, different types of information in the battery data can be associated with different Modbus registers, or other different entities, fields, addresses, codes, or portions of the battery data.

However, different suppliers and/or manufacturers of batteries may configure batteries to use different sets of Modbus registers, addresses or other battery data elements, to report the same types of information and/or different types of information. For instance, a first battery manufacturer may configure its batteries to report two hundred types of parameters in native battery data, while a second battery manufacturer may configure its batteries to report four hundred types of parameters in native battery data. The four hundred types of parameters reported by batteries of the second battery manufacturer may include some or all of the two hundred types of parameters reported by batteries of the first battery manufacturer, but the battery manufacturers may configure their batteries to use different Modbus registers, addresses, or other battery data elements to report those common types of parameters.

The machine power system 104 can include a control system 120 that is configured to interpret and use battery data associated with the battery 102. The control system 120 can be configured to process, and/or configure the machine power system 104 to operate based on, battery data associated with the battery 102. For example, the control system 120 can cause the machine power system 104 to monitor the battery 102 based on battery data, configure one or more elements based on battery data, display the battery data and/or information derived from the battery data in a user interface, and/or otherwise operate based at least in part on the battery data. The control system 120 may be based at least in part on computer-executable instructions that are executable by the machine power system 104, such as software and/or firmware associated with the machine power system 104.

For example, battery data may indicate that the battery 102 outputs energy 108 at a particular voltage level. Accordingly, the control system 120 may configure the DC-to-DC converter discussed above to convert the energy 108 received from the battery 102 from the particular voltage level indicated by the battery data to a different voltage level that is compatible with the DC-to-AC inverter discussed above. As another example, the control system 120 can be associated with a user interface that allows users to view information associated with the battery 102 based on the battery data, such as diagnostic information, status information, battery alerts, and/or any other type of information.

However, the control system 120 may be configured to process battery data in a different format than the format of the native battery data 110. For example, the control system 120 may be hard coded to interpret data associated with certain Modbus registers as certain types of parameters. However, the battery 102 may be configured to use different Modbus registers to report those types of parameters in the native battery data 110. For instance, the native battery data 110 may be provided in a format associated with the battery 102, and/or the manufacturer or supplier of the battery 102, as discussed above. The format of the native battery data 110 may be different than a battery data format that the control system 120 is programmed to interpret and use.

However, the battery data translator 106 is configured to receive the native battery data 110 from the battery 102, and translate the native battery data 110 into translated battery data 112 that is formatted based on the battery data format used by the control system 120. The battery data translator 106 is also configured to provide the translated battery data 112 to the control system 120, such that the control system 120 processes, and/or configures the machine power system 104 to operate based on, the translated battery data 112 associated with the battery 102.

The battery data translator 106 is a computing device that is positioned in a battery data communication path between the battery 102 and the machine power system 104. The battery data translator 106 can have multiple data transmission interfaces 122, including at least two battery data interfaces similar to the battery data interface 118 of the battery 102 and/or the machine power system 104. The battery data translator 106 can accordingly receive the native battery data 110 from the battery 102 via a first battery data interfaces, and can transmit the translated battery data 112 to the machine power system 104 via a second battery data interface. In some examples, the data transmission interfaces 122 of the battery data translator 106 may include different types of battery data interfaces. For example, the battery data translator 106 may connect to the machine power system 104 via a first Ethernet-based battery data interface, and also have a second Ethernet-based battery data interface and a CAN bus interface. In this example, the battery data translator 106 may connect to the battery 102 via either the second Ethernet-based battery data interface or the CAN bus interface, depending on which type of battery data interface the battery 102 has.

In some examples, the data transmission interfaces 122 can also include one or more other data interfaces, such as Ethernet ports, serial ports, USB ports, other wired network interfaces, wireless network interfaces, transceivers, modems, antennas, and/or other data transmission components, that can transmit and/or receive data over network connections or direct connections to other computing devices. As a first example, the battery data translator 106 may have one or more data transmission interfaces 122 that allow a user to connect a mobile phone, laptop computer, or other type of computing device to the battery data translator 106 via a wired or wireless connection in order to access a user interface associated with the battery data translator 106, as discussed further below. As another example, the battery data translator 106 may use a data transmission interface to retrieve data from a remote server via a network connection, as discussed further below. In some examples, one or more data transmission interfaces 122 of the battery data translator 106 may allow the battery data translator 106 to connect to other wired and/or wireless data communication elements of the machine in order to exchange data with remote servers and/or user devices. For instance, if the machine has a separate cellular modem, wireless networking interface, or other wireless network elements, the battery data translator 106 may interface with the wireless network elements of the machine to wirelessly communicate with remote servers and/or user devices.

The battery data translator 106 includes at least one processor 124 and memory 126. The processor 124 may be a central processing unit (CPU) or any other type of processing unit. The processor 124 may have one or more arithmetic logic units (ALUs) that perform arithmetic and logical operations, and/or one or more control units (CUs) that extract instructions and stored content from processor cache memory, and executes such instructions by calling on the ALUs during program execution. The processor 124 may also access content and computer-executable instructions stored in the memory 126, and execute such computer-executable instructions.

The memory 126 can include system memory, which may be volatile (such as RAM), non-volatile (such as ROM, flash memory, etc.) or some combination of the two. The memory 126 can further include non-transitory computer-readable media, such as volatile and/or non-volatile, removable and/or non-removable media configured to store information such as computer readable instructions, data structures, program modules, and/or other data. System memory, removable storage, and non-removable storage are all examples of non-transitory computer-readable media. Examples of non-transitory computer-readable media include, but are not limited to, RAM, ROM, EEPROM, flash memory or other memory technology, optical storage, magnetic cassettes, magnetic tape, magnetic disk storage or other magnetic storage devices, or any other non-transitory medium which can be used to store information and which can be accessed by the battery data translator 106. Any such non-transitory computer-readable media may be part of the battery data translator 106.

The memory 126 can store computer-readable instructions and/or other data associated with operations of the battery data translator 106, including a translation manager 128 and a translation map 130. The translation manager 128 can translate the native battery data 110, received from the battery 102, into the translated battery data 112 according to the translation map 130 associated with the battery 102.

The translation map 130 indicates which data elements of the native battery data 110 correspond to specific data elements of the battery data format used by the machine power system 104. The control system 120 of the machine power system 104 may be hard coded, or be otherwise pre-configured, to interpret battery data according to a particular format. For instance, the control system 120 can be programmed to interpret information provided in association with a first Modbus register as a current charge state of a battery, to interpret information provided in association with a second Modbus register as a voltage level of a battery, and to interpret other information provided in association with specific Modbus registers as other specific types of information. The translation map 130 may accordingly be a table, database, or other mapping data that indicates which registers, addresses, or other data elements in the native battery data 110 correspond to the registers, addresses, or other data elements that the control system 120 is configured to use and interpret.

As a non-limiting example, the battery 102 may be configured to use Modbus register number 30123 to indicate a charge level of the battery 102 in the native battery data 110. However, the control system 120 may be pre-configured to interpret a value provided in association with Modbus register number 31526 as the charge level of the battery 102. The translation map 130 associated with the battery 102 can accordingly indicate that Modbus register number 30123 in the native battery data 110 maps to Modbus register number 31526 in the battery data format used by the control system 120 of the machine power system 104. The translation map 130 can similarly indicate mapping relationships between other Modbus registers in the native battery data 110 and Modbus registers in the battery data format used by the control system 120. Accordingly, the translation manager 128 can use the translation map 130 to identify data elements in the native battery data 110 and to generate translated battery data 112 that indicates those data elements in a different order and/or with respect to different registers or addresses based on the battery data format the control system 120 is configured to use.

In some examples, the memory 126 can store a translation map repository 132 that includes a set of pre-configured translation maps. When the battery 102 is installed in the machine, the translation manager 128 can be configured to determine which of the pre-configured translation maps in the translation map repository 132 is associated with the battery 102. As discussed above, different batteries may be configured to report the same types of information, and/or different types of information, using different battery data formats. Accordingly, different batteries can be associated with different translation maps that indicate different mappings of data elements in native battery data to data elements the control system 120 is configured to use.

As a non-limiting example, a first battery manufacturer may configure its batteries to use Modbus register number 30156 to indicate battery temperatures, while a second battery manufacturer may configure its batteries to use Modbus register number 32781 to indicate battery temperatures. The control system 120 may be configured to interpret values in Modbus register 31552 as battery temperature information. Accordingly, the translation map repository 132 may have a first translation map associated with batteries of the first battery manufacturer that maps data from Modbus register number 30156 in native battery data to Modbus register 31552 in translated battery data, and also have a second translation map associated with batteries of the second battery manufacturer that maps data from Modbus register number 32781 in native battery data to Modbus register 31552 in translated battery data. The translation manager 128 may, in some examples, determine that the battery 102 is associated with the second battery manufacturer and accordingly use the second translation map to convert the native battery data 110 to the translated battery data 112.

Figure 4:
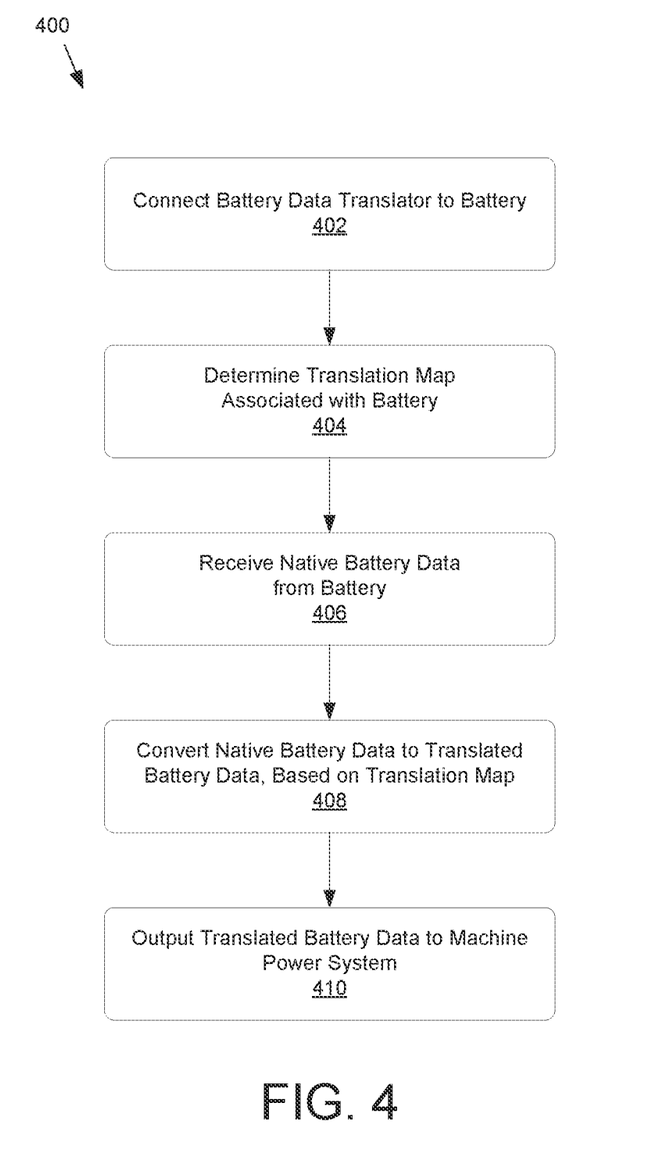
FIG. 4 shows a flowchart illustrating an example process the battery data translator can use to convert native battery data from the battery into translated battery data compatible with the machine power system of the machine.

The translation manager 128 can be associated with a user interface that can be accessed by a user device. An example of such a user interface is shown in FIG. 4, and is described further below with respect to that figure. In some examples, the user interface can be a local interface associated with user interface data 134 stored in the memory 126 of the battery data translator 106. A user may access and use the local user interface, associated with the user interface data 134, by connecting a separate computer, mobile device, or other user device to the battery data translator 106. For example, the user interface data 134 can be associated with a webpage interface of a web server operated by the battery data translator 106, or any other type of user interface hosted by the battery data translator 106. In other examples, the user interface can be associated with an application, such as mobile application, that executes on a user device and is configured to communicate with the translation manager 128. In still other examples, the user interface can be hosted on a remote server, or other remote computing device, that a user can access via a user device and that is configured to communicate with the translation manager 128.

The memory 126 can further store other modules and data 136, which can be utilized by the battery data translator 106 to perform or enable performing any action taken by the battery data translator 106. The modules and data 136 can include a platform, operating system, firmware, and/or applications, and data utilized by the platform, operating system, firmware, and/or applications.

In some examples, the translation manager 128 can be configured to identify, from among a set of translation maps in the translation map repository 132 stored locally in the memory 126 of the battery data translator 106, the translation map 130 associated with the battery 102. For instance, the translation manager 128 may determine a battery identifier associated with the battery 102, such as a battery model number, a battery manufacturer identifier, a battery supplier identifier, and/or any other type of battery identifier. As a first example, a user can provide user input, via a user interface as described above, that indicates a battery identifier, such that the translation manager 128 can identify the corresponding translation map 130 in the translation map repository 132. As another example, the translation manager 128 may be configured to analyze the native battery data 110 received from the battery 102, determine whether a battery identifier is included with the native battery data 110, and if so identify the corresponding translation map 130 in the translation map repository 132. The translation manager 128 can accordingly use the translation map 130 associated with the battery 102 to convert the native battery data 110 into the translated battery data 112 that the battery data translator 106 provides to the machine power system 104.

In other examples, a translation map repository may be stored at a remote server, or other remote computing device. In these examples, the translation manager 128 may use user input and/or information included in the native battery data 110 to determine the battery identifier associated with the battery 102, and use a network connection to retrieve the corresponding translation map 130 associated with the battery 102 from the remote translation map repository. The translation manager 128 can accordingly use the translation map 130 retrieved from the remote translation map repository to convert the native battery data 110 into the translated battery data 112 that the battery data translator 106 provides to the machine power system 104.

In still other examples, the translation manager 128 can generate the translation map 130 associated with the battery 102 based on user input. As discussed further below with respect to FIG. 4, a user interface may be configured to allow a user to input mapping data that indicates which data elements of the native battery data 110 correspond to data elements of the battery data format used by the machine power system 104. For example, the user interface may present a list of data types used by the machine power system 104, and provide drop-down menus, data entry fields, or other user interface elements the user can use to enter register numbers, addresses, or other identifiers that a battery manual, or other documentation associated with the battery 102, indicates are associated with the listed data types. The translation manager 128 can be configured to generate the translation map 130 according to the user-provided mapping data. For instance, the translation manager 128 can be configured with a predefined list of the registers and data types used by the control system 120, and generate the translation map 130 by performing one-way mapping operations to map the user-provided register numbers to the corresponding registers used by the control system 120. In other examples, a user may access a similar user interface via an application executing on a user device or a remote server, such that the application or remote server can generate the translation map 130 based on the user input and provide the translation map 130 to the battery data translator 106.

As yet another example, the translation manager 128 may be configured to generate the translation map 130 associated with the battery 102 automatically, without user input. The translation manager 128 may have one or more machine learning models, artificial intelligence systems, and/or rule-based models that can be configured to generate the translation map 130 based on the native battery data 110. The machine learning models or artificial intelligence systems can be based on convolutional neural networks, recurrent neural networks, other types of neural networks, nearest-neighbor algorithms, regression analysis, Gradient Boosted Machines (GBMs), Random Forest algorithms, deep learning algorithms, and/or other types of artificial intelligence or machine learning frameworks.

For example, machine learning model associated with the translation manager 128 may be trained on a training set of data that indicates historical mappings between information in known historical battery data formats and the addresses, registers, or other data elements that are associated with that information in the battery data format used by the machine power system 104. The machine learning model can accordingly be trained to predict which data elements of the native battery data 110 correspond to data elements of the battery data format used by the machine power system 104, and generate the corresponding translation map 130 based on such predictions.

As a non-limiting example, although different battery data formats may use different Modbus registers to indicate battery temperature values, the training set of data may indicate which registers in one or more sets of historical battery data correspond to battery temperature values, and indicate historical battery temperature values reported in association with those registers. The machine learning model can accordingly be trained to identify which types of values and/or range of values, are reported as battery temperature values in the training data set. The translation manager 128 may accordingly use the trained machine learning model to analyze the native battery data 110 and predict which data element of the native battery data 110 is most likely to be a reported battery temperature value. The translation manager 128 can therefore generate the translation map 130 based on this prediction and similar predictions associated with other types of values.

As another example, the translation manager 128 may analyze the native battery data 110 to determine whether the native battery data 110 directly indicates parameter names or other parameter identifiers in association with reported values. In these examples, the translation manager 128 may generate the translation map 130 based on identifiers of the parameters indicated within the native battery data 110.

In some examples, the translation manager 128 may be configured to cause the battery data translator 106 to send a wake-up signal, or other instructions, to the battery 102. The wake-up signal, or other instructions, may prompt the battery 102 to begin transmitting the native battery data 110 to the battery data translator 106. Accordingly, the translation manager 128 can receive the native battery data 110 and use the received native battery data 110 to generate the translation map 130 automatically, or to determine whether the received native battery data 110 indicates a battery identifier that corresponds to a pre-generated translation map that is already stored in the translation map repository 132 or a remote translation map repository.

The elements of the battery data translator 106 may, in some examples, be at least partially enclosed with a housing associated with the battery data translator 106. For instance, the battery data translator 106 can be a standalone component positioned between the battery 102 and the machine power system 104 in the machine, and that is connected to both the battery 102 and the machine power system 104 as shown in FIG. 1. In other examples, the elements of the battery data translator 106 may be stored in, or integrated into, a battery compartment or container that can accept and store the battery 102. The battery 102 may be removable from such a battery compartment or container, such that the battery 102 can be removed and replaced with a different battery. In still other examples, the elements of the battery data translator 106 may be integrated into a power system compartment or container that may also hold one or more elements of the machine power system 104.

Overall, as shown in FIG. 1, the battery data translator 106 receives native battery data 110 from the battery 102, generates or identifies the translation map 130 associated with the battery 102, and uses the translation map 130 to convert the native battery data 110 into the translated battery data 112 that is compatible with the machine power system 104. In some examples, the battery data translator 106 can generate or identify the translation map 130 associated with the battery 102 during an installation process for the battery 102. For example, when the battery 102 is connected to the machine, the battery data translator 106 can determine which pre-existing translation map to use in association with the newly-connected battery 102, or generate a new translation map to use in association with the newly-connected battery 102. Although FIG. 1 shows a single battery in a machine system 100 for a machine, the machine may be powered by more than one battery. In examples in which the machine receives power from multiple batteries, different battery data translators may be used to convert native battery data from different batteries into translated battery data that is compatible with the machine power system 104, as described below with respect to FIG. 2.

Figure 2:
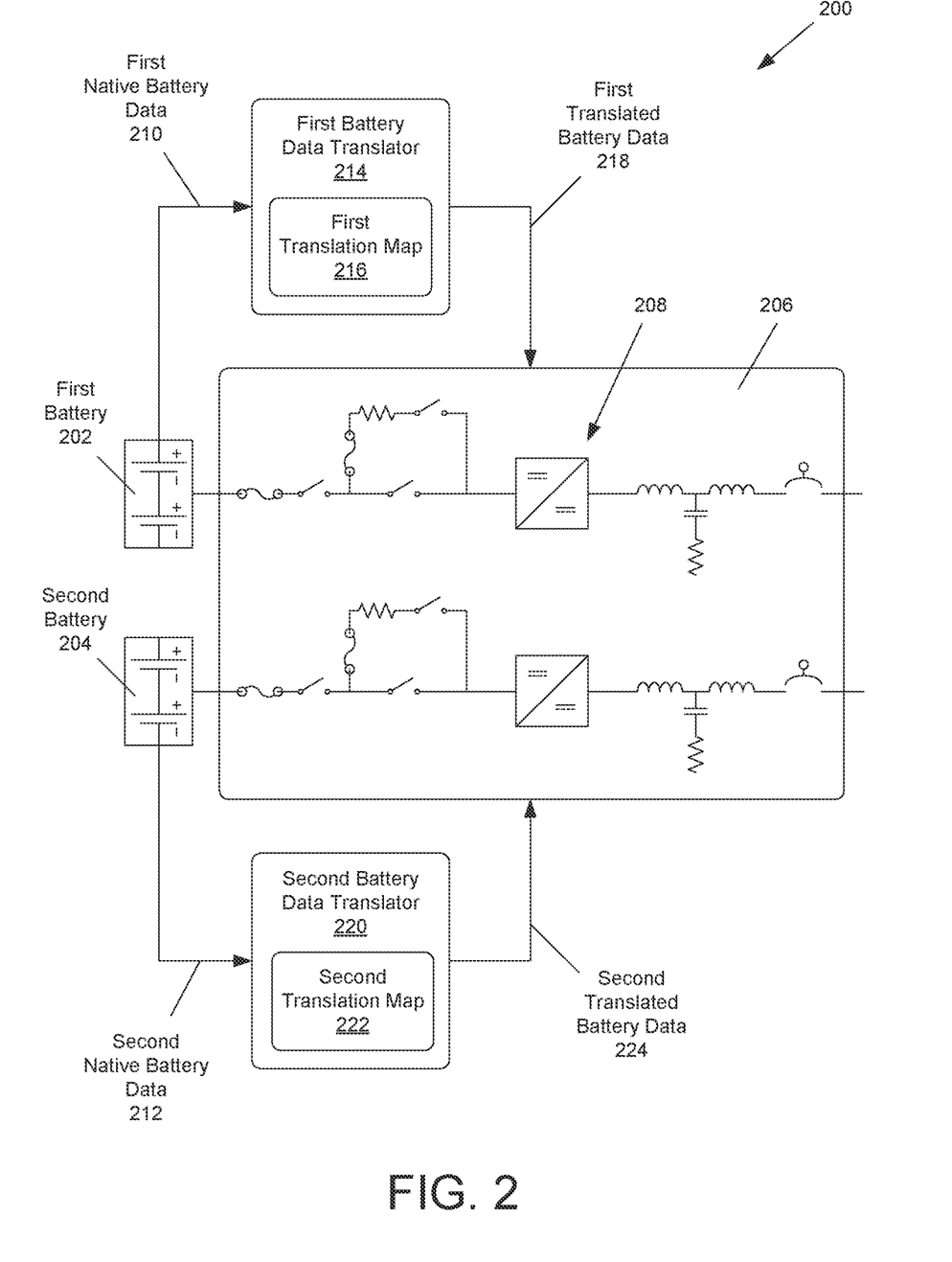
FIG. 2 shows a second example schematic view of a machine system that includes two or more batteries.

FIG. 2 shows a second example schematic view of a machine system 200 that includes two or more batteries, including a first battery 202 and a second battery 204. Any number of batteries, including the first battery 202 and the second battery 204, can be connected to provide energy to a machine power system 206 similar to the machine power system 104 described above.

For example, the machine power system 206 includes electrical components 208, similar the electrical components 116 discussed above, such as DC-to-DC converters, DC-to-AC inverters, and/or other electrical components. In some examples, different batteries may output energy at different voltage levels. In these examples, DC-to-DC converters may convert the energy from different batteries to a consistent voltage level that is compatible with one or more DC-to-AC inverters and/or other electrical components 208 of the machine power system 206. The machine power system 206 may include additional, and/or different, electrical components 208 than the electrical components 208 shown in FIG. 2.

Each of the batteries that power a machine in the example machine system 200 may be similar to the battery 102 shown in FIG. 1. In some examples, the batteries can each be the same type of battery and use the same battery data format. However, in other examples, the machine may be configured to accept multiple types of batteries and/or be powered by different types of batteries concurrently. Accordingly, one or more of the batteries may be different types of batteries, and/or use different battery data formats, than one or more other batteries.

For example, the first battery 202 and the second battery 204 shown in FIG. 2 may have been manufactured or configured by different battery manufacturers or suppliers, may use different types of battery technologies, may be different battery models, may use different types of battery data interfaces, and/or vary in one or more other ways. Accordingly, the first battery 202 may output first native battery data 210 based on a first battery data format, while the second battery 204 may output second native battery data 212 based on a second battery data format. In some examples, one of both of the first battery data format and the second battery data format can be different than a battery data format that the machine power system 206 is configured to use.

However, battery data translators, similar to the battery data translator 106 described above, can be connected between the batteries and the machine power system 206. As discussed above with respect to FIG. 1, the battery data translators can individually identify or generate translation maps associated with the corresponding batteries, and use the translation maps to convert native battery data provided by the batteries into translated battery data that is compatible with the machine power system 206.

For example, a first battery data translator 214 can be installed in a data communication path between the first battery 202 and the machine power system 206. The first battery data translator 214 can be configured to receive the first native battery data 210 from the first battery 202, use a first translation map 216 to convert the first native battery data 210 into first translated battery data 218, and provide the first translated battery data 218 to the machine power system 206.

Similarly, a second battery data translator 220 can be installed in a data communication path between the second battery 204 and the machine power system 206. The second battery data translator 220 can be configured to receive the second native battery data 212 from the second battery 204, use a second translation map 222 to convert the second native battery data 212 into second translated battery data 224, and provide the second translated battery data 224 to the machine power system 206.

In this example, the first battery data translator 214 may identify and/or generate the first translation map 216 independently from the second battery data translator 220 identifying and/or generating the second translation map 222. For example, the first battery 202 may have been installed in the machine a year ago, and the first battery data translator 214 may have identified and started using the first translation map 216 a year ago. However, the second battery 204 may be a new battery that has just been installed in the machine to replace a previous battery. The previous battery may or may not have used the same battery data format as the new second battery 204. Accordingly, as part of the installation of the new second battery 204, the second battery data translator 220 may identify and/or generate the second translation map 222, and begin using the second translation map 222 to convert the second native battery data 212 to the second translated battery data 224.

Figure 3:
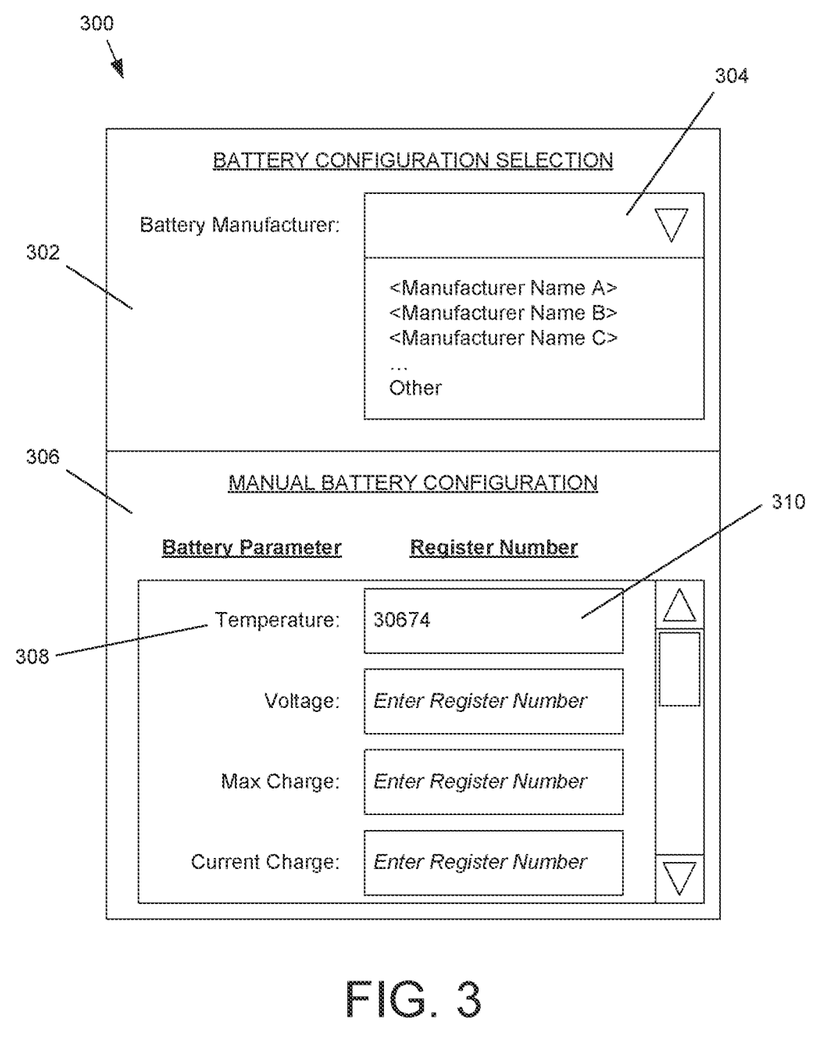
FIG. 3 shows an example user interface associated with the battery data translator.

FIG. 3 shows an example user interface 300 associated with the battery data translator described herein. A user can provide user input, via the user interface 300, that the battery data translator can use to identify and/or generate a translation map for a battery.

In some examples, the user interface 300 can be a local user interface, which a user device can display based on a connection to the battery data translator. For example, the battery data translator can provide the user interface 300 as a webpage to a web browser executing on a user device. The user interface 300 may be rendered and/or displayed by the battery data translator using user interface data 134 as discussed above with respect to FIG. 3.

In other examples, the user interface 300 can be associated with an application that executes on a user device or a remote computing device. In some of these examples, user input provided via the user interface 300 to a user device or a remote computing device can be provided to the battery data translator so that the identify and/or generate a translation map for a battery. In other examples, the user device or the remote computing device can use provided user input to identify and/or generate a translation map associated with a battery, and can provide the translation map to the battery data translator.

The user interface 300 may have a battery configuration selection portion 302 that includes a battery identification element 304. The battery identification element 304 can be a drop-down menu, text field, search field, or other user interface element that allows a user to select a battery manufacturer name, a battery supplier name, a battery model identifier, and/or any other battery identifier that corresponds to a pre-configured translation map. For example, if the battery data translator has a translation map repository 132 that includes a set of pre-configured translation maps, the battery identification element 304 can present a list of battery manufacturers or other battery identifiers that correspond to the set of pre-configured translation maps in the translation map repository 132. Accordingly, if a user has installed a battery that corresponds to one of the battery identifiers that can be selected via the battery identification element 304, the user may select that battery identifier and the battery data translator can retrieve and/or use the translation map that corresponds to the user-selected battery identifier.

The user interface 300 may also, or alternately, have a manual battery configuration portion 306. In some examples, the manual battery configuration portion 306 may be used to provide information about a battery if the battery identification element 304 does not include an identifier of the battery and/or if the battery data translator does not have access to a pre-configured translation map associated with the battery.

The manual battery configuration portion 306 may include a list of battery parameters 308. The manual battery configuration portion 306 may also include a set of data entry fields 310 or other user interface elements configured to accept register numbers, addresses, or other identifiers or portions of native battery data that correspond with the battery parameters 308. For example, a user who purchases a new battery and installs the new battery in a machine may have access to a manual or other documentation about the new battery that indicates which Modbus registers the battery uses to report different types of battery parameters. Accordingly, the user can use the data entry fields 310 of the manual battery configuration portion 306 to enter the Modbus register numbers provided in the battery manual for the battery parameters 308.

The battery data translator can be configured to generate a new translation map based on user input provided via the manual battery configuration portion 306. For example, the battery data translator can be configured with a pre-configured list of the registers and data types used by a machine control system of a machine, and can generate a translation map by performing one-way mapping operations to map user-provided register numbers to corresponding registers used by the machine control system of the machine.

FIG. 4 shows a flowchart 400 illustrating an example process a battery data translator can use to convert native battery data from a battery into translated battery data compatible with a machine power system of a machine. In some examples, the battery data translator can perform the process shown in FIG. 4 as part of an installation process for the battery.

At block 402, the battery data translator is connected to the battery. Connecting the battery to the battery data translator, for instance via a battery data interface of the battery and a data transmission interface of the battery data translator, can allow the battery data translator to receive native battery data from the battery and/or exchange other signals or data with the battery.

At block 404, the battery data translator determines a translation map associated with the battery. The translation map can indicate mappings between first data elements of a first battery data format associated with the battery and second data elements of a second battery format associated with the power system of the machine.

In some examples, the battery data translator can at least attempt to automatically identify and use a translation map associated with the battery. In these examples, the battery data translator can determine whether native battery data received from the battery includes information that indicates a battery identifier associated with the battery. The battery identifier may be a model number of the battery, an identifier of a manufacturer or supplier of the battery, and/or other identifying information associated with the battery. For example, a Modbus register in the native battery data may indicate a name of the manufacturer that manufactured the battery.

If the battery data translator automatically detects such a battery identifier in the native battery data, the battery data translator can accordingly identify and retrieve a corresponding translation map at block 404. The battery data translator may retrieve a translation map associated with the detected battery identifier from a translation map repository that stores a set of pre-configured translation maps associated with different battery identifiers. The translation map repository may be stored locally in memory of the battery data translator, or may be stored by a remote server the battery data translator can communicate with to retrieve the translation map associated with the battery identifier. In some examples, the battery data translator may send a wake-up signal, or other message, to prompt the battery to begin sending native battery data, such that the battery data translator can attempt to detect a battery identifier in the native battery data and retrieve a corresponding translation map from a translation map repository.

In other examples, a user can provide user input, via a user interface, that indicates the battery identifier of the battery. For example, a user can use the user interface shown in FIG. 3 to indicate the battery identifier of the battery. Accordingly, at block 404 the battery data translator can identify and retrieve the translation map that corresponds with the user-provided battery identifier from a local or remote translation map repository.

In still other examples, the battery data translator can generate a new translation map at block 404 that is associated with the battery. For instance, if a local or remote translation map repository does not already contain a translation map associated with the battery, or the battery data translator did not determine a battery identifier associated with the battery based on native battery data or user input, the battery data translator can generate a new translation map. In some examples, the battery data translator can use a machine learning model or other system to predict which data elements of the native battery data correspond to data elements of the battery data format used by the machine control system, and can use such predictions to generate a new translation map at block 404. In other examples, a user can provide user input, via a user interface, that indicates which data elements of the native battery data correspond to a list of battery parameters presented via the user interface, and thus correspond with data elements of the battery data format used by the machine control system. The battery data translator can accordingly use such user-provided data to generate a new translation map at block 404.

After determining the translation map associated with the battery at block 404, the battery data translator receives native battery data from the battery at block 406. In some examples, the battery data translator may also have received native battery data at block 404, for example in response to a wake-up signal, and used the initial native battery data to automatically determine or generate the translation map at block 404.

At block 408, the battery data translator uses the translation map determined at block 404 to convert the native battery data received at block 406 into translated battery data that is formatted based on a battery data format used by the machine power system of the machine. For example, the translation map may indicate that information associated with a first Modbus register in the native battery data should be expressed in association with a second Modbus register in the translated battery data. Accordingly, the battery data translator can use the translation map to convert, reformat, and/or re-order information in the native battery data to generate the translated battery data.

At block 410, the battery data translator outputs the translated battery data to the machine power system. The translated battery data can be formatted according to a particular battery data format the machine power system is configured to use. Accordingly, the machine power system can directly use the translated battery data in association with the battery. For instance, the machine power system may configure electrical components to convert, and/or operate based on, energy provided by the battery, monitor the battery based on information expressed in the translated battery data, display battery alerts and/or other battery information in a user interface based on information expressed in the translated battery data, and/or otherwise use the translated battery data.

Accordingly, the battery data translator can use the process shown in FIG. 4 to enable the battery to be used with the machine power system, even if the machine power system is not itself configured to interpret the native battery data provided by the battery. If the machine is powered by multiple batteries, different batteries can be connected to different battery data translators that can individually use the process shown in FIG. 4 to determine translation maps corresponding to the batteries and to convert native battery data from the batteries into translated battery data that the machine power system can interpret and use.

INDUSTRIAL APPLICABILITY

A machine power system of a machine, such as the machine power system 104 shown in FIG. 1 and/or the machine power system 206 shown in FIG. 2, may be configured to receive and process battery data in a particular format. For example, the control system 120 of the machine power system 104 can be hard-coded, or otherwise programmed, to operate according to a particular battery data format used by an original equipment manufacturer (OEM) of an original battery that is pre-installed on the machine when the machine is first sold or deployed for use in the field. However, if the original battery is later replaced with a new battery, such as an aftermarket battery, from a different manufacturer, the new battery may be configured to output native battery data in a different format than the OEM battery. Accordingly, because the machine power system of the machine is programmed specifically to interpret the OEM battery data format, the machine power system may not be able to directly interpret and use the native battery data output by the new battery.

In some cases, the machine power system of the machine could be manually re-programmed to accept and use the native battery data output by the new battery. However, such manual reprogramming of the machine power system can take a significant amount of time and effort. For example, a programmer may have to edit existing lines of code, write new lines of code, re-compile the code, and/or perform debugging and/or validation procedures to verify that the new code operates as intended and/or does not conflict with other software or firmware on the machine before the new code can be deployed for use by the machine power system. Additionally, if the machine has already been sold or deployed in the field when a new battery is installed, such as during an aftermarket replacement of the battery, a programmer may not be available to manually reprogram the machine power system.

The battery data translator described herein can allow a battery to be replaced in a machine and to be used with a machine power system of the machine without re-programming or re-configuring the machine power system itself. For example, if an OEM battery in a machine is replaced with an aftermarket battery produced by a different battery manufacturer, a battery data translator can be positioned in a data communication path between the aftermarket battery and the machine power system. The machine power system may have been programmed to interpret a particular battery data format used by the OEM battery, and may not be programmed to interpret a different battery data format used by the aftermarket battery. However, the battery data translator can use a translation map associated with the aftermarket battery to convert native battery data from the aftermarket battery into translated battery data that is formatted according to the OEM battery data format that the machine power system is programmed to interpret. Accordingly, the aftermarket battery can be installed and used by the machine without re-programming or re-configuring the machine power system itself. This can allow batteries to be swapped out or replaced relatively quickly in the machine, and allow batteries from any supplier or manufacturer to be used in the machine, without time and effort it would take to manually reprogram and re-validate the machine power system itself.

Moreover, if the machine is powered by multiple batteries, battery data translators associated with different batteries can allow the machine to accept and use different types of batteries and/or batteries from different manufacturers or suppliers at the same time. For example, if a machine uses an array of four batteries, a user may replace one of the four batteries with a new battery from a different manufacturer than the battery being replaced. A battery data translator connected to the new battery can identify or generate a translation map associated with the new battery, and use the translation map to convert native battery data from the new battery data into a format that is compatible with a machine power system of the machine. Any or all of the other three batteries may also be associated with battery data translators that use similar translation maps to convert native battery data from those batteries into a format compatible with the machine power system. Accordingly, the four batteries used concurrently by the machine may include a mixture of batteries from different suppliers or manufacturers.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A battery data translator, comprising:
one or more processors;
a first data transmission interface configured to communicate with a first battery data interface of a battery;
a second data transmission interface configured to communicate with a second battery data interface of a machine power system; and
memory storing computer-executable instructions that, when executed by the one or more processors, cause the battery data translator to perform operations comprising:
receiving native battery data, formatted based on a first battery data format, from the first battery data interface of the battery via the first data transmission interface, wherein the native battery data expresses a plurality of parameters via first registers defined by the first battery data format;
determining a translation map associated with the first battery data format and a second battery data format used by the machine power system, the translation map indicating a plurality of mappings between:
  the first registers, defined by the first battery data format, that correspond to the plurality of parameters, and
  second registers, defined by the second battery data format, that also correspond to the plurality of parameters;
converting, based on the translation map, the native battery data into translated battery data that expresses the plurality of parameters via the second registers; and
transmitting the translated battery data to the second battery data interface of the machine power system via the second data transmission interface.

2. The battery data translator of claim 1, wherein determining the translation map associated with the first battery data format and the second battery data format comprises:
  determining a battery identifier associated with the battery in the native battery data or based on user input; and
  retrieving, from a translation map repository that stores a plurality of pre-configured translation maps associated with battery identifiers, the translation map based on the battery identifier.

3. The battery data translator of claim 2, wherein the translation map repository is stored locally in the memory.

4. The battery data translator of claim 2, wherein the translation map repository is stored at a remote computing device, and the battery data translator is configured to retrieve the translation map from the remote computing device via a network connection.

5. The battery data translator of claim 1, wherein determining the translation map associated with the first battery data format and the second battery data format comprises:
  receiving, via a user interface associated with the battery data translator, user input that indicates the first registers that correspond with individual parameters, of the plurality of parameters, presented via a list in the user interface; and
  generating the translation map based on the user input and a predefined list of the second registers.

6. The battery data translator of claim 1, wherein determining the translation map associated with the first battery data format and the second battery data format comprises:
  predicting, using a machine learning model trained on historical mappings of registers in other battery data formats to the second registers, the plurality of mappings; and
  generating the translation map based on the plurality of mappings predicted by the machine learning model.

7. The battery data translator of claim 1, wherein:
  the machine power system is associated with a machine, the battery is installed in the machine and is configured to provide energy to the machine power system; and
  the battery data translator is installed in a data communication path between the first battery data interface of the battery and the second battery data interface of the machine power system.

8. A computer-implemented method, comprising:
receiving, by one or more processors of a battery data translator associated with a machine, and from a first battery data interface of a battery installed in the machine, native battery data that:
  is formatted based on a first battery data format, and
  expresses a plurality of parameters via first registers defined by the first battery data format;
determining, by the one or more processors, a translation map associated with the first battery data format and a second battery data format used by a machine power system of the machine, wherein the translation map indicates a plurality of mappings between:
  the first registers, defined by the first battery data format, that correspond to the plurality of parameters, and
  second registers, defined by the second battery data format, that also correspond to the plurality of parameters;
converting, by the one or more processors and based on the translation map, the native battery data into translated battery data that expresses the plurality of parameters via the second registers; and
causing, by the one or more processors, transmission of the translated battery data to a second battery data interface of the machine power system.

9. The computer-implemented method of claim 8, wherein determining the translation map associated with the first battery data format and the second battery data format comprises:
  determining, by the one or more processors, a battery identifier associated with the battery in the native battery data or based on user input; and
  retrieving, by the one or more processors, and from a translation map repository that stores a plurality of pre-configured translation maps associated with battery identifiers, the translation map based on the battery identifier.

10. The computer-implemented method of claim 8, wherein determining the translation map associated with the first battery data format and the second battery data format comprises:
  receiving, by the one or more processors, and via a user interface associated with the battery data translator, user input that indicates the first registers that correspond with individual parameters, of the plurality of parameters, presented via a list in the user interface; and
  generating, by the one or more processors, the translation map based on the user input and a predefined list of the second registers.

11. The computer-implemented method of claim 8, wherein determining the translation map associated with the first battery data format and the second battery data format comprises:
  predicting, by the one or more processors, and using a machine learning model trained on historical mappings of registers in other battery data formats to the second registers, the plurality of mappings; and
  generating the translation map based on the plurality of mappings predicted by the machine learning model.

12. The computer-implemented method of claim 8, wherein:
  the battery is configured to provide energy to the machine power system, and
  the battery data translator is installed in a data communication path between the first battery data interface of the battery and the second battery data interface of the machine power system.

13. A machine, comprising:
a battery configured to:
  output energy, and
  output, via a first battery data interface, native battery data formatted based on a first battery data format, wherein the native battery data expresses a plurality of parameters via first registers defined by the first battery data format;
a machine power system configured to:
receive the energy from the battery, and
receive, via a second battery data interface, battery data formatted based on a second battery data format, wherein the battery data expresses the plurality of parameters via second registers defined by the second battery data format; and
a battery data translator positioned in a data communication path between the first battery data interface of the battery and the second battery data interface of the machine power system, wherein the battery data translator is configured to:
receive the native battery data from the first battery data interface of the battery;
determine a translation map associated with the first battery data format and the second battery data format, the translation map indicating a plurality of mappings between:
the first registers, defined by the first battery data format, that correspond to the plurality of parameters, and
the second registers, defined by the second battery data format, that also correspond to the plurality of parameters;
convert, based on the translation map, the native battery data into translated battery data that expresses the plurality of parameters via the second registers; and
transmit the translated battery data to the second battery data interface of the machine power system.

14. The machine of claim 13, wherein the machine power system comprises at least one power conversion system.

15. The machine of claim 13, wherein the machine power system comprises a control system that is hard coded to use the second battery data format.

16. The machine of claim 13, further comprising:
a second battery configured to:
output second energy to the machine power system; and
output, via a third battery data interface, second native battery data formatted based on a third battery data format, wherein the second native battery data expresses the plurality of parameters via third registers defined by the third battery data format; and
a second battery data translator positioned in a second data communication path between the third battery data interface of the second battery and the second battery data interface of the machine power system, wherein the second battery data translator is configured to:
receive the second native battery data from the third battery data interface of the second battery;
determine a second translation map associated with the second battery data format and the third battery data format, the second translation map indicating a second plurality of mappings between:
the third registers, defined by the third battery data format, that correspond to the plurality of parameters, and
the second registers, defined by the second battery data format, that also correspond to the plurality of parameters;
convert, based on the second translation map, the second native battery data into second translated battery data that expresses the plurality of parameters via the second registers; and
transmit the second translated battery data to the second battery data interface of the machine power system.

17. The machine of claim 16, wherein the battery and the second battery are associated with at least one of different battery manufacturers or different battery types.

18. The machine of claim 13, wherein the battery data translator determines the translation map associated with the first battery data format and the second battery data format by:
determining a battery identifier associated with the battery in the native battery data or based on user input; and
retrieving, from a translation map repository that stores a plurality of pre-configured translation maps associated with battery identifiers, the translation map based on the battery identifier.

19. The machine of claim 13, wherein the battery data translator determines the translation map associated with the first battery data format and the second battery data format by:
receiving, via a user interface associated with the battery data translator, user input that indicates the first registers that correspond with individual parameters, of the plurality of parameters, presented via a list in the user interface; and
generating the translation map based on the user input and a predefined list of the second registers.

20. The machine of claim 13, wherein the battery data translator determines the translation map associated with the first battery data format and the second battery data format by:
predicting, using a machine learning model trained on historical mappings of registers in other battery data formats to the second registers, the plurality of mappings; and
generating the translation map based on the plurality of mappings predicted by the machine learning model.

* * * * *